US007287627B2

(12) United States Patent
Eckenstein et al.

(10) Patent No.: US 7,287,627 B2
(45) Date of Patent: Oct. 30, 2007

(54) GRAVITY OPERATED CABLE BRAKE FOR AN ELEVATOR

(75) Inventors: Rudolf Eckenstein, Baar (CH); Carlos Latorre Marcuz, Shanghai (CN)

(73) Assignee: Inventio AG, Hergiswil NW (CH)

( * ) Notice: Subject to any disclaimer, the term of this patent is extended or adjusted under 35 U.S.C. 154(b) by 111 days.

(21) Appl. No.: 11/300,894

(22) Filed: Dec. 15, 2005

(65) Prior Publication Data

US 2006/0118366 A1 Jun. 8, 2006

(51) Int. Cl.
*B60T 7/12* (2006.01)

(52) U.S. Cl. .................... 188/137; 188/65.1; 188/188; 188/139

(58) Field of Classification Search ............... 188/65.1, 188/188, 119, 129, 137, 139, 140 R, 170
See application file for complete search history.

(56) References Cited

U.S. PATENT DOCUMENTS 1,738,214 A 12/1929 Thurston
1,864,588 A 6/1932 Dunlop
1,934,508 A 11/1933 McCormick
3,327,811 A 6/1967 Mastroberte
3,669,223 A 6/1972 Arnold
4,923,055 A 5/1990 Holland
5,101,937 A * 4/1992 Burrell et al. .............. 187/350
5,197,571 A 3/1993 Burrell et al.
5,217,091 A 6/1993 Shiina et al.
5,228,540 A * 7/1993 Glaser ........................ 187/355
5,299,661 A 4/1994 Pramanik et al.
5,628,385 A * 5/1997 Yumura et al. ............. 187/373
5,653,312 A 8/1997 Kato
6,223,868 B1 5/2001 Wullimann

FOREIGN PATENT DOCUMENTS

DE 142 032 6/1980
DE 196 35 244 3/1998
EP 0 651 724 B1 5/1995
WO WO94/02404 2/1994

* cited by examiner

*Primary Examiner*—Devon Kramer
(74) *Attorney, Agent, or Firm*—Butzel Long

(57) ABSTRACT

A cable brake has an electromagnet releasably retaining a mass that falls down guide rods under the effect of gravity and impacts a first arm of a trigger lever. Upon impact by the mass, the trigger lever rotates a second arm with a pawl to release a crossbar, whereupon pressure springs press a moveable brake plate against a cable strand to halt the cable strand. A return mechanism utilizes a screw and cooperating nut or a coupler to return the moveable brake plate and pre-stress the pressure springs.

12 Claims, 7 Drawing Sheets

GRAVITY OPERATED CABLE BRAKE FOR AN ELEVATOR

BACKGROUND OF THE INVENTION

The present invention relates to a cable brake for an elevator to halt a cable strand by applying a brake plate on the cable strand, and having a release trigger mechanism to introduce the brake action and apply the braking force of the brake plate, the brake plate being returnable to an initial position after the brake action by a return mechanism.

The patent document EP 0 651 724 B1 shows a cable brake wherein the elevator car supporting cables extend between two brake plates. The one brake plate is connected with the brake enclosure and the other brake plate is moveable. Each of a pair of links has one end pivotally connected with the other brake plate and an opposite end engaging a cam follower. The cam follower is released by an electromagnetic latch controlled by an overspeed governor and rides on a pair of cam surfaces under the force of a pair of springs to move the other brake plate toward the one brake plate to clamp the cables and stop movement of the elevator car. The initial compression of the springs is by a hydraulic cylinder.

A disadvantage of this equipment is that the cable brake is expensive. The trigger mechanism, the cam follower and cam surfaces, and the brake enclosure are costly to manufacture and time consuming to install.

SUMMARY OF THE INVENTION

The present invention provides a remedy. The present invention avoids the disadvantages of the known equipment and provides a simple and reliably working cable brake.

The advantages provided by the present invention are essentially in that the release of the cable brake takes place by gravity. The trigger mechanism is simple to build. The gravity actuated mass element of the cable brake improves which the trigger Release reliability improves, sudden. The simple return mechanism is further advantageous with a twofold function. The cable brake can be made operational again by the return mechanism after a trigger release. Moreover, the pressure springs of the return mechanism can be pre-stressed differently according to load as well as a speed of the elevator car. Furthermore, the simple cable brake does not require additional equipment, is practically maintenance-free and needs no external energy input. The cable brake according to the present is inexpensive to manufacture and install.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
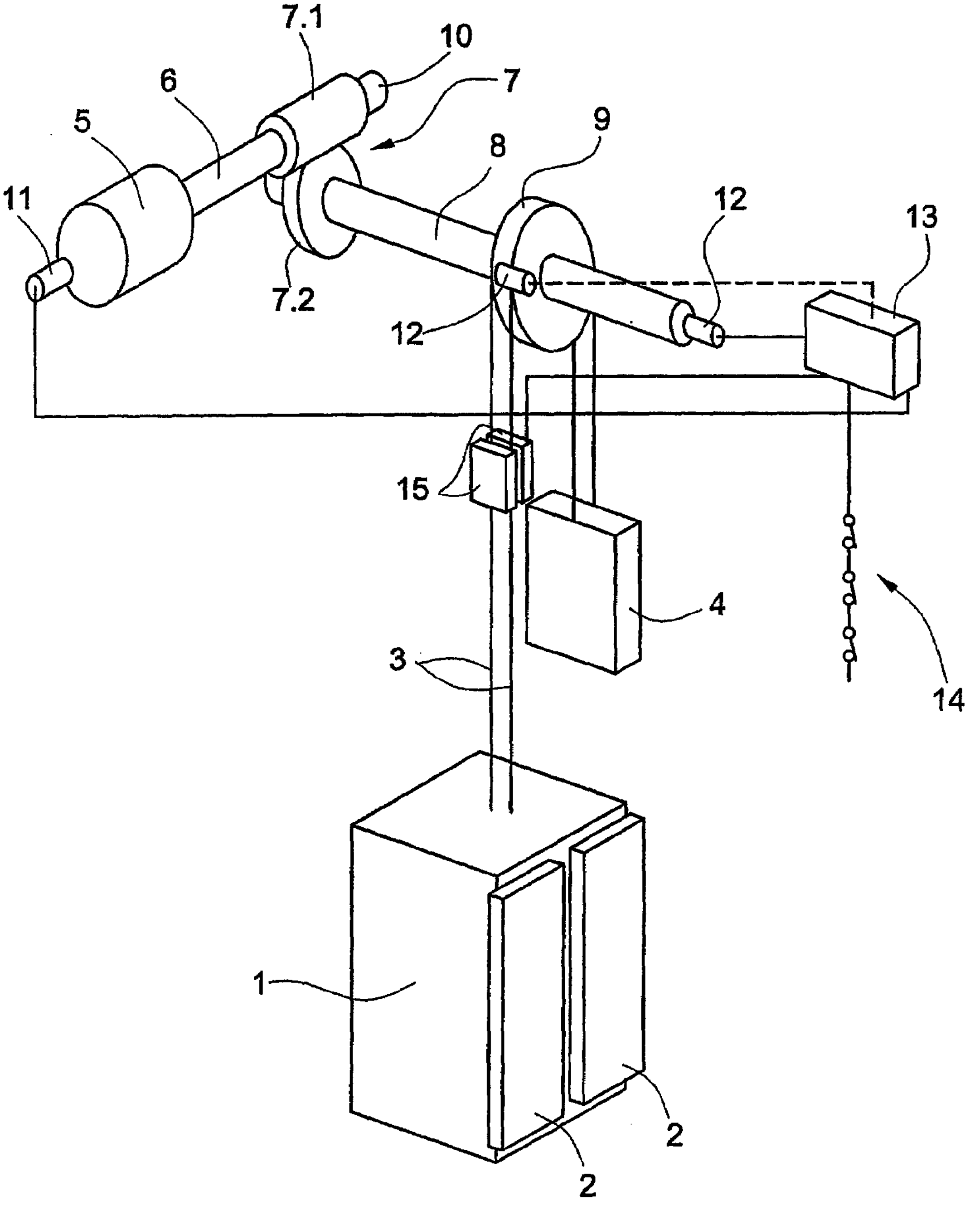
FIG. 1 is a schematic representation of an elevator installation with the cable brake according to the present invention.

FIG. 1 is a schematic representation of an elevator installation with a cable brake according to the present invention providing braking security. In a not illustrated elevator shaft, an elevator car 1 with doors 2 is connected by cable strands 3 with a counterweight 4 for vertical movement in the elevator shaft. An electric motor 5 drives a gear mechanism 7 by an input shaft 6. At an output shaft 8 of the gear mechanism 7 is mounted a drive sheave 9 for driving the cable strands 3. The gear mechanism 7 includes a worm 7.1 at the input shaft 6 and a mating gear 7.2 at the output shaft 8. Other mechanism-types like, for example, a crown gear set are also possible. A motor brake 10 is attached to a free end of the input shaft 6.

At the opposite end of the input shaft 6 is a first encoder 11 for sensing the speed of the input shaft 6. At and end of the output shaft 8 is mounted a second encoder 12 for sensing the speed of the output shaft 8. As a variation, the second encoder 12 can, as shown by a dashed line, instead of sensing the speed of the output shaft 8 sense the speed of the drive sheave 9 or the movement of the cables 3. The signals generated by the encoders 11, 12 are inputs to a controller 13 that also is connected to a safety relay chain 14 and has an output for activating a cable brake 15 according to the present invention. The controller 13 and the encoders 11, 12 form a detector to monitor the speeds of the input shaft 6 and the output shaft 8 and to generate an activation signal for the cable brake 15.

Figure 2:
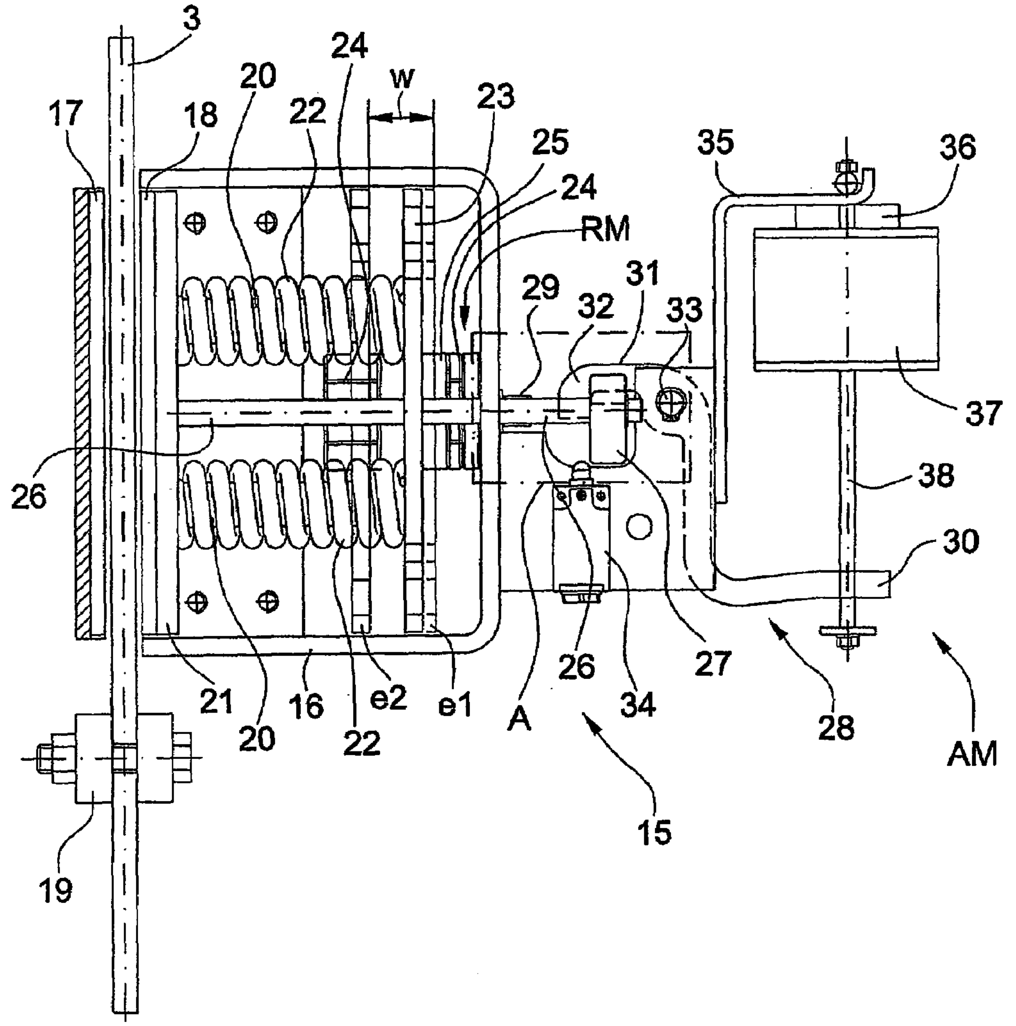
FIG. 2 is a side elevation view of the cable brake according to the present invention with a vertical cable path.

FIG. 2 shows the principal construction of the cable brake 15 with a vertical cable path. The cable brake 15 includes a housing 16 at which a first brake plate 17 (shown in cross section) is fixed and a second brake plate 18 is movably mounted. During normal operation, the cable strands 3 move vertically between the brake plates 17, 18. The cable strands 3 are arranged in a plane extending parallel to braking surfaces of the brake plates 17, 18 and are held by a clamp 19. Attached to the second brake plate 18 is a first pressure plate 21 having a plurality of rods 20 extending away from the brake plate 18. The rods 20 each carry a pressure spring 22 that is retained between the first pressure plate 21 and a second pressure plate 23 in the housing 16. The second printing plate 23 is movable in the housing 16 by means of a screw 24 and a cooperating nut 25 along a path "w" to pre-stress the pressure springs 22 according to position of the second pressure plate 23. In a first position "e1" of the plate 23, the pressure springs 22 are relaxed. A pair of release bars 26 each have one end attached to the first pressure plate 21 and an opposite free end movable relative a pawl 32. The release bars 26 extend through the second pressure plate 23 and the housing 16 and have the free ends connected by a crossbar 27. After engagement of the crossbar 27 with the pawl 32 of a first trigger lever 28, the adjusting screw 24 is turned at a screw head 29 whereby the second pressure plate 23 is moved from the position "e1" to reach a desired position along the path "w". The screw 24 with the screw head 29 and the nut 25 form a return mechanism RM for resetting the brake at the position "e1". The second pressure plate 23 is movable until reaching a final position "e2". The working position of the second pressure plate 23 is dependent on the pressure springs 22, the elevator car 1 and the load as well as the nominal speed of the elevator car 1.

The first trigger lever 28 has a first arm 30 and a second arm 31 with the pawl 32, the arms extending from a first axis 33 of rotation. In operation, the pawl 32 is engaged with the crossbar 27. The position of the crossbar 27 is sensed, for example, by a limit switch 34. At a bracket 35 there is mounted an electromagnet 36 that, in an activated condition, holds a mass element 37 in the upper position shown. The bracket 35, the electromagnet 36, the mass element 37, a pair of guide rods 38 and the first trigger lever 28 form a release mechanism AM.

Figure 6:
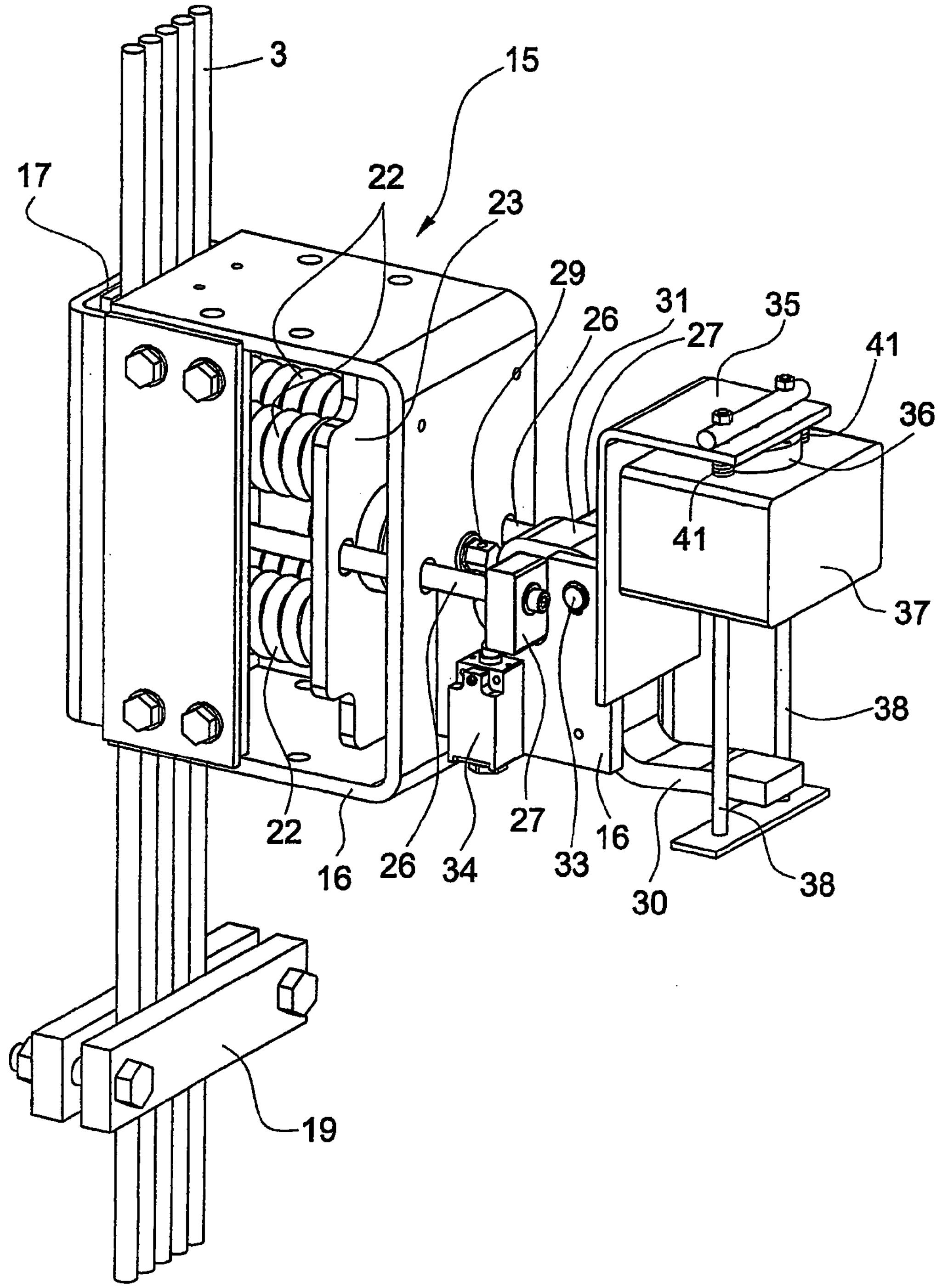
FIG. 6 is a perspective view of the cable brake shown in FIG. 2.

As soon as the electromagnet 36 is switched off, the mass element 37 falls downwardly along the guide rods 38 under effect of the gravity and strikes the first arm 30 of the first trigger lever 28. Springs 41 (FIG. 6) will assist in returning the mass element 37 to the electromagnet 36 that is switched back on. Through rotation of the first trigger lever 28 about the axis 33, the pawl 32 releases the crossbar 27 and, aided by the pressure springs 22, the freed release bars 26 move the brake plate 18 to press against the cable strands 3.

Figure 3:
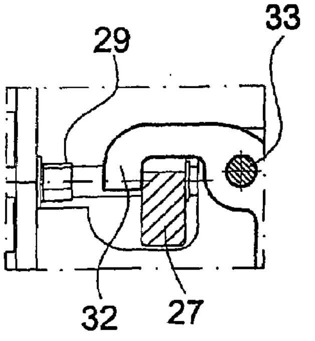
FIGS. 3–5 are enlarged views of the trigger mechanism operation of the cable brake shown in FIG. 2.
Figure 4:
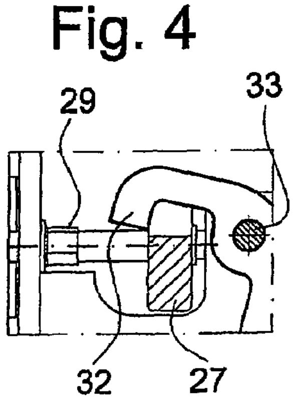
Figure 5:
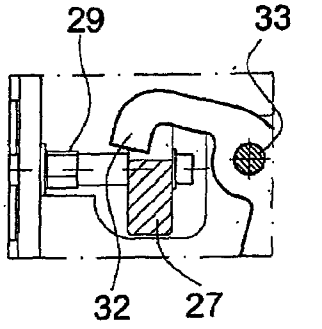

FIG. 3, FIG. 4 and FIG. 5 show the portion of the cable brake 15 in an area "A" of the release mechanism AM. FIG. 3 shows the cable brake 15 in a normal operating state. The pawl 32 is engaged with the crossbar 27. The cable strands 3 pass between the brake plates 17, 18 freely. FIG. 4 shows the position of the pawl 32 after the impact of the mass element 37 on the first arm 30 of the first trigger lever 28. The crossbar 27 is set free and the braking of the cable strands 3 is imminent. FIG. 5 shows the position of the crossbar 27 after the pressure springs 22 have pressed the second brake plate 18 against the cable strands 3.

Figure 7:
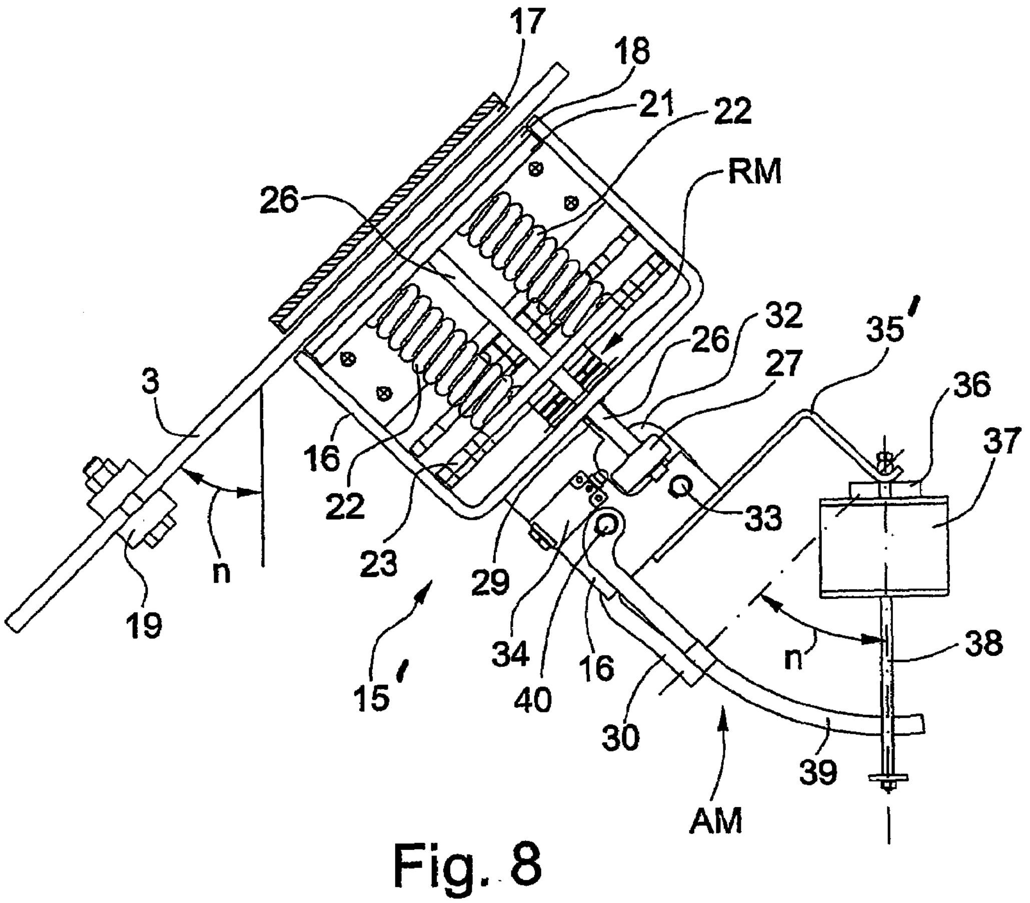
FIG. 7 and FIG. 8 are side elevation views of the cable brake according to the present invention with an angled cable path.
Figure 8:
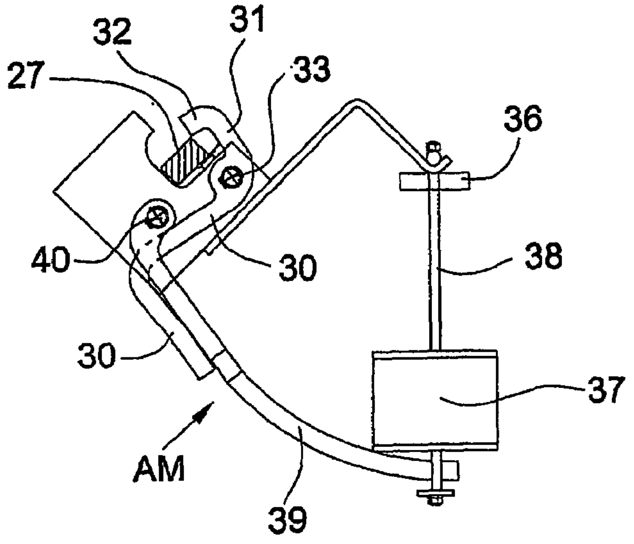
Figure 9:
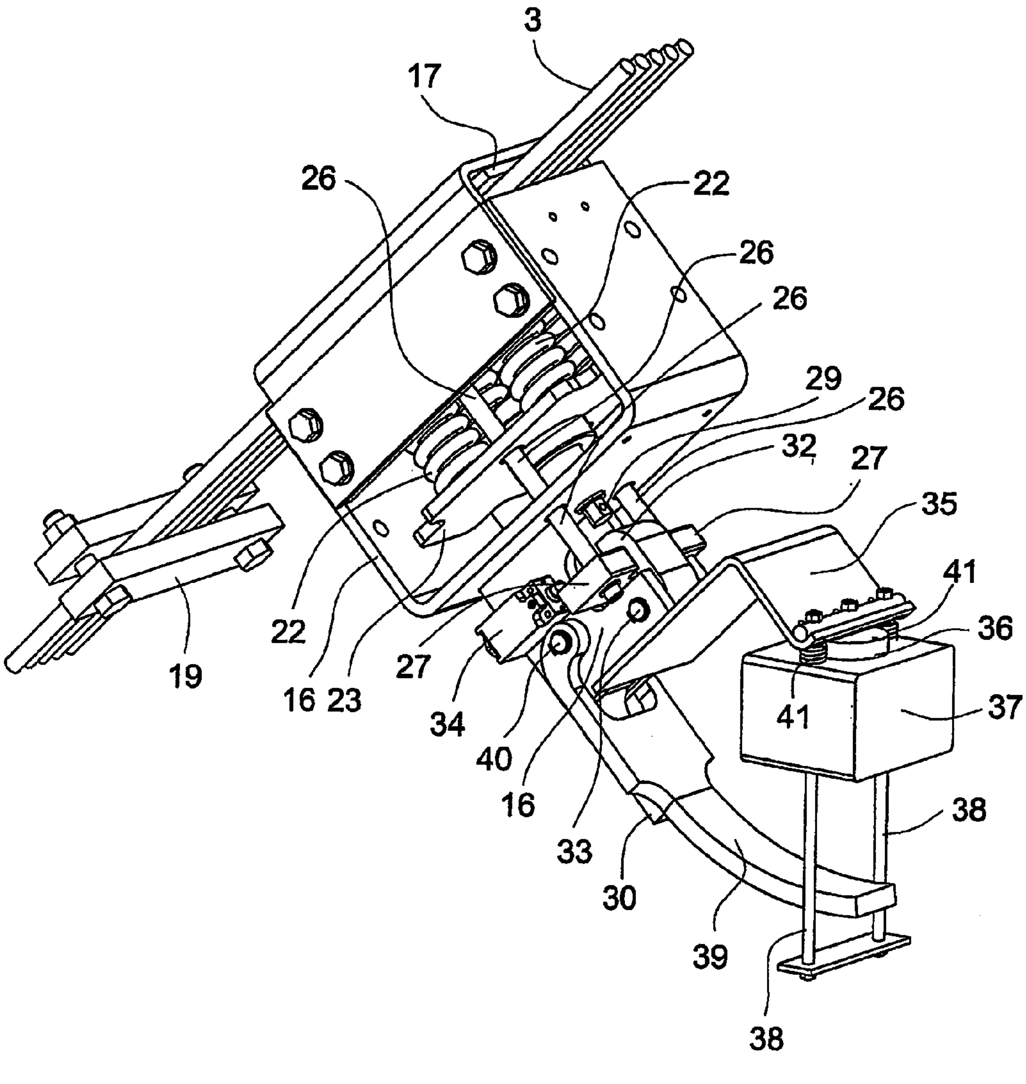
FIG. 9 is a perspective view of the cable brake shown in FIGS. 7 and 8.

FIG. 7 and FIG. 8 show the principal construction of a cable brake 15' according to the present invention with a slanted cable path. FIG. 9 is a perspective representation of the cable brake with the slanted cable path. The cable path extends at an angle "n" relative to the vertical and the cable brake 15' is the same as the previously discussed cable brake 15 with the exception of a modified bracket 35'. With that, the vertical arrangement of the guide rods 38 remains to retain the manner of functioning of the mass element 37. In the released fall, the mass element 37 impacts a second trigger lever 39, mounted for rotation at a second axis 40 of rotation, and operates the first trigger lever 28. FIG. 8 shows the position of the pawl 32 after the fall of the mass 37 on the second trigger lever 39.

Figure 10:
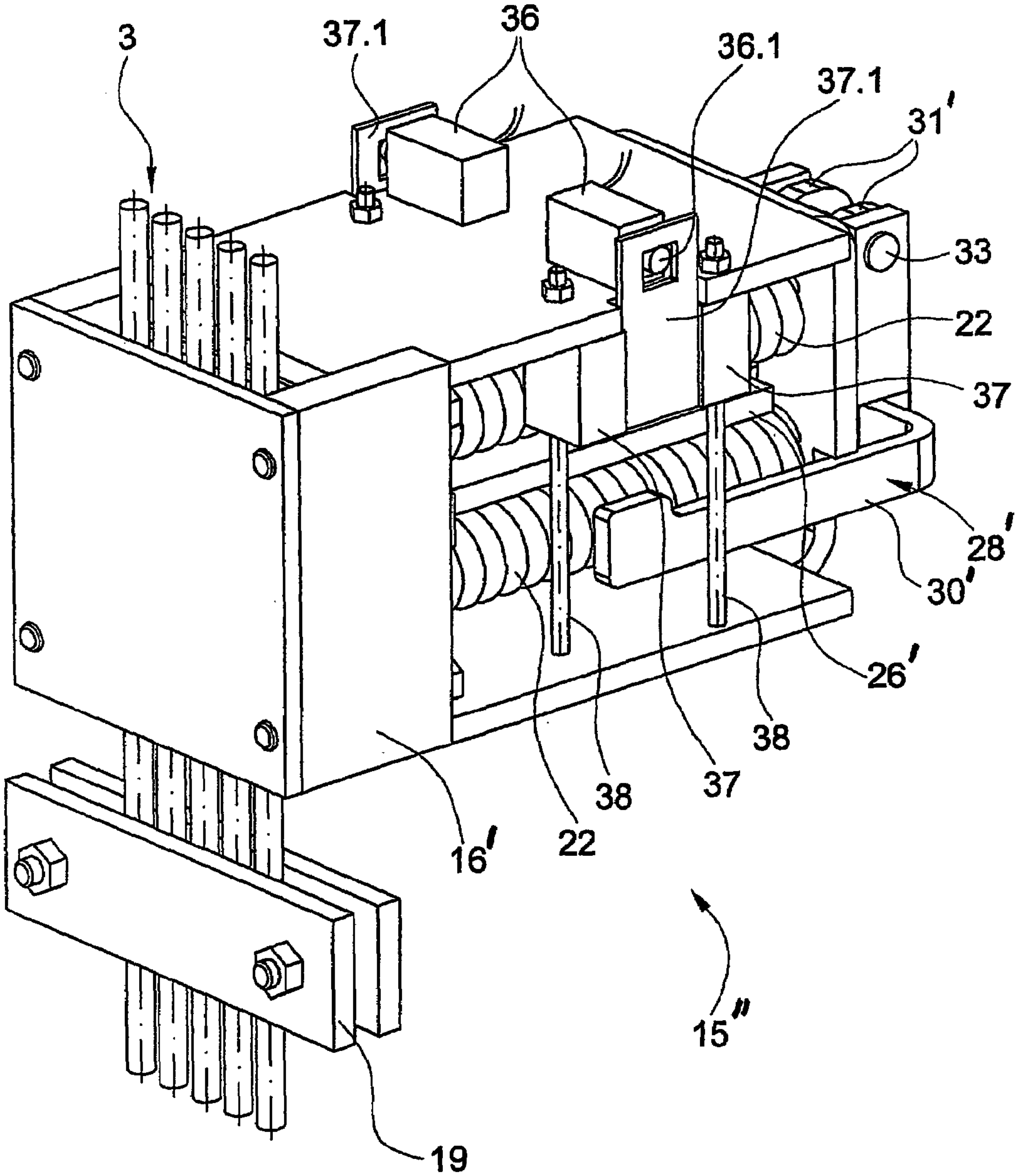
FIG. 10 is perspective view of an alternate embodiment of the cable brake according to the present invention with a vertical cable path.
Figure 11:
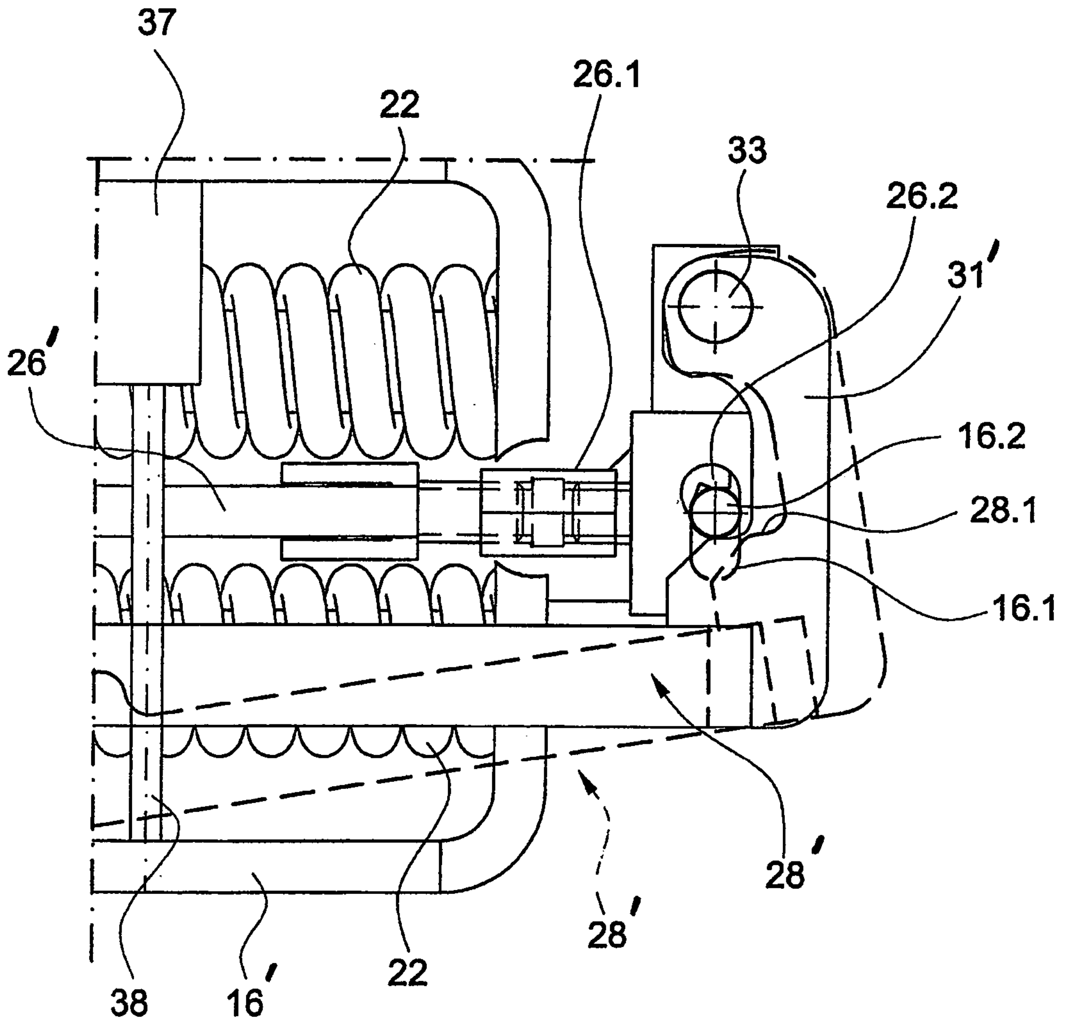
FIG. 11 is an enlarged side elevation view of the trigger mechanism shown in FIG. 10.

FIG. 10 shows an alternate embodiment cable brake 15" according to the present invention. The pressure springs 22 are supported at one end by a housing 16' and at an opposite end by the first pressure plate 21. A single release bar 26 has one end attached to the first pressure plate 21 and an opposite end threadably engaging a dual threaded adjusting nut or coupler 26.1 (FIG. 11). A pair of guide rods 38 at each side of the housing 16' mounts one of a pair of mass elements 37 each having an apertured plate 37.1. Each of a pair of electromagnets 36 has an armature bolt 36.1 that engages a corresponding one of the apertures in the plates 37.1 to hold the mass elements in the upward position shown in the drawings. When the electromagnets 36 are switched off, the armature bolts 36.1 are withdrawn and the mass elements 37 fall each impacting an associated first arm 30' of a U-shaped first trigger lever 28' having a second arm 31'. This rotates the trigger lever 28' about the axis 33.

FIG. 11 shows details of the release mechanism of the cable brake 15". The release trigger 28' is represented in solid line in a first position. A vertically elongated slot 16.1 is formed in the housing of 16 and receives a bolt 16.2. A pawl 28.1 of the trigger lever 28' forces the bolt 16.2 upwardly in the slot 16.1 to engage a pawl 26.2 threaded into the coupler 26.1 at the free end of the release bar 26' to hold the second brake plate 18 (not shown) away from the cable strands 3. Upon rotational movement of the trigger lever 28' to the position shown in dashed line in response to the fallen mass elements 37, the pawl 28.1 releases the bolt 16.2 to move downwardly. The falling bolt 16.2 releases the pawl 26.2 and, under the effect of the pressure springs 22, the release bar 26' is moved in the direction of the cable strands 3 and the brake action is introduced.

The return or resetting of the release bar 26' takes place by rotation of the coupler 26.1. Upon return of the trigger lever 28' to the solid line position, rotation of the coupler 26.1 in a first direction extends the pawl 26.2 from the release bar 26' into engagement with the bolt 16.2. Then rotation of the coupler 26.1 in the opposite direction draws the release bar 26' toward the pawl 26.2 to disengage the second brake plate 18 from the cable strands 3 and again compress the pressure springs 22.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A cable brake for an elevator for halting a cable strand comprising:

a fixed brake plate;

a moveable brake plate mounted to permit the cable strand to pass between said fixed brake plate and said moveable brake plate;

a spring means connected to said moveable brake plate;

a release mechanism connected to said moveable brake plate wherein actuation of said release mechanism permits said spring means to move said moveable brake plate toward said fixed brake plate to apply a braking force to the cable strand, said release mechanism including a mass element for actuating said release mechanism by impact under an effect of gravity; and a return mechanism connected to said moveable brake plate for moving said moveable brake plate away from the cable stand to remove the braking force.

2. The cable brake according to claim 1 wherein said mass element moves along guide rods under the effect of gravity to impact and rotate a trigger lever.

3. The cable brake according to claim 2 wherein said trigger lever has a first arm upon which said mass element impacts and a second arm with a pawl releasably engaging a crossbar connected to a release bar.

4. The cable brake according to claim 3 wherein said release bar is connected to a first pressure plate and a position of said crossbar is sensed by a sensor means.

5. The cable brake according to claim 4 wherein said sensor means is a limit switch.

6. The cable brake according to claim 2 wherein said trigger lever has a first arm upon which said mass element impacts and a second arm with a first pawl releasably engaging a bolt, said bolt releasably engaging a second pawl connected a release bar.

7. The cable brake according to claim 6 wherein said release bar is connected to said second pawl by a coupler of said return mechanism for returning said second pawl and said moveable brake plate to a resetting position.

8. The cable brake according to claim 1 wherein said mass element is guided in a generally vertical direction under the effect of gravity and said fixed brake plate and said moveable brake plate are oriented to halt the cable strand extending in one of the generally vertical direction and a direction at an angle to the generally vertical direction.

9. The cable brake according to claim 1 including an electromagnet for releasably retaining said mass element and another spring means biasing said mass element toward said electromagnet.

10. The cable brake according to claim 1 including an electromagnet having a selectively moveable armature bolt for releasably retaining said mass element.

11. A cable brake for an elevator for halting a cable strand comprising:

a fixed brake plate;

a moveable brake plate mounted to permit the cable strand to pass between said fixed brake plate and said moveable brake plate;

a spring means connected to said moveable brake plate;

a release mechanism connected to said moveable brake plate wherein actuation of said release mechanism permits said spring means to move said moveable brake plate toward said fixed brake plate to apply a braking force to the cable strand, said release mechanism including a mass element for actuating said release mechanism by movement under the effect of gravity and an electromagnet for releasably retaining said mass element; and a return mechanism connected to said moveable brake plate for moving said moveable brake plate away from the cable stand to remove the braking force.

12. A cable brake for an elevator for halting a cable strand comprising:

a fixed brake plate;

a moveable brake plate mounted to permit the cable strand to pass between said fixed brake plate and said inoveable brake plate;

a spring means connected to said moveable brake plate;

a release mechanism connected to said moveable brake plate wherein actuation of said release mechanism permits said spring means to move said moveable brake plate toward said fixed brake plate to apply a braking force to the cable strand, said release mechanism including a mass element for actuating said release mechanism under an effect of gravity wherein said mass element moves along guide rods to impact and rotate a trigger lever; and a return mechanism connected to said moveable brake plate for moving said moveable brake plate away from the cable stand to remove the braking force.

* * * * *

UNITED STATES PATENT AND TRADEMARK OFFICE

CERTIFICATE OF CORRECTION

PATENT NO. : 7,287,627 B2

APPLICATION NO. : 11/300894

DATED : October 30, 2007

INVENTOR(S) : Rudolf Eckenstein et al.

It is certified that error appears in the above-identified patent and that said Letters Patent is hereby corrected as shown below:

On the title page, items [30] add: This application is a Con of PCT/CH2004/003.

On the title page, add: Item [30] Foreign Application Priority Data European patent office (EPO) 03405430.4 6/16/2003.

Signed and Sealed this

First Day of April, 2008

JON W. DUDAS

*Director of the United States Patent and Trademark Office*